United States Patent [19]

Saneshige et al.

[11] Patent Number: 5,027,025

[45] Date of Patent: Jun. 25, 1991

[54] FLAT BRUSHLESS MOTOR

[75] Inventors: Ryoji Saneshige; Kouzi Kuyama; Makoto Hasegawa; Miyuki Furuya, all of Yonago, Japan

[73] Assignee: Matsushita Electric Industrial Co., Ltd., Osaka, Japan

[21] Appl. No.: 476,730

[22] Filed: Feb. 8, 1990

[30] Foreign Application Priority Data

Feb. 8, 1989 [JP] Japan .................................. 1-29114

[51] Int. Cl.$^5$ ............................................ H02K 21/12
[52] U.S. Cl. ..................................... 310/156; 310/81; 310/184; 310/268
[58] Field of Search ............... 310/156, 268, 261, 262, 310/265, 267, 264, 184, 81, 80, 82, 208, 89, 40 MM; 318/114; 128/32, 34–36; 74/61, 87

[56] References Cited

U.S. PATENT DOCUMENTS

| 2,761,079 | 8/1956 | Giertz-Hedstrom | 310/268 |
| 2,857,536 | 10/1958 | Light | 310/82 |
| 3,638,056 | 1/1972 | Imris | 310/261 |
| 4,067,244 | 1/1978 | Baumers | 74/61 |
| 4,456,858 | 6/1984 | Loven | 310/156 |
| 4,728,837 | 3/1988 | Bhadra | 310/81 |

FOREIGN PATENT DOCUMENTS

| 0078557 | 5/1983 | European Pat. Off. | 310/156 |
| 0084825 | 1/1955 | Norway | 310/81 |

Primary Examiner—R. Skudy
Attorney, Agent, or Firm—Wenderoth, Lind & Ponack

[57] ABSTRACT

The present invention is directed to a flat brushless motor utilizable as a warning in a portable communication device. The center of gravity of the rotor assembly is displaced from the center of rotation so that, by the rotation of the unbalanced rotor assembly, vibrations can be generated and the. By elimination of an eccentric or the like for generating the vibrations, a manufacture in a flat and compact size, as well as a reduction in the number of component parts, can be attained.

2 Claims, 3 Drawing Sheets

FLAT BRUSHLESS MOTOR

BACKGROUND OF THE INVENTION

1. Field of the Invention

The present invention relates to a flat brushless motor utilizable in a portable communication device or the like.

2. Description of the Prior Art

It has been a problem that a conventional communication device, such as a pocket bell, only alerts a particular person, but the audible signals are in fact transmitted to other people on the occasion of a meeting, conference, etc.

As such, a device designed to alert a particular person only by way of vibrations has been developed, and a brushless motor has been utilized as a source of the vibrations.

One example of the flat brushless motor of rotary type will be described hereinbelow with reference to the accompanying drawings.

FIG. 5 illustrates the conventional flat brushless motor of rotary back-yoke type.

Reference numeral 1 represents a flat annular magnet magnetized so as to have N- and S-poles in a circumferential direction in which magnetic fluxes are generated; reference numeral 2 represents a rotor frame for shielding the magnetic fluxes produced by the magnet 1; reference numeral 3 represents a bracket for generating a thrust force in an axial direction by magnetic fluxes leaking out from the rotor frame 2; reference numeral 3a represents a carrier made of insulating material for holding coils; reference numeral 4 represents a plurality of flat coils interlinking the magnetic fluxes generated by the magnet 1 for generating a rotating force when an electric current runs thereacross; reference numeral 5 represents a back-yoke for enclosing a magnetic circuit of main magnetic fluxes produced by the magnet 1; and reference numeral 6 represents a weight for causing the motor to generate unbalanced vibrations. Reference numeral 7 represents a shaft of the motor; reference numeral 8 represents a sleeve bearing; and reference numeral 9 represents a rotor boss rigidly mounted on the shaft 7 and to which the rotor frame 2 and the back-yoke 5 are secured.

FIG. 6 illustrates the shape of the weight 6.

With respect to the conventional flat brushless motor of rotary back-yoke type constructed as hereinabove described, the operation thereof will be described hereinafter.

Assuming that magnetic fluxes are generated from the magnet 1, the magnetic flux developing downwards is shielded by the rotor frame 2 and the bracket 3. Because of this, the main magnetic flux develops in a direction towards the coil 4.

If an electric current is allowed to flow across the coils 4 under this condition, a magnetic field is developed by the current and a rotating force is produced by the relationship with the magnetic flux of the magnet 1. Also, a magnetic circuit is formed by the magnetic flux towards the back-yoke 5 to thereby increase the efficiency or the motor. The weight 6 with its unbalanced shape is fixed to the shaft 7, so that the motor is allowed to produce an unbalanced rotation when the weight 6 is rotated.

However, in the conventional construction, since a portion corresponding to the weight 6 renders the thickness of the motor to be large, there are problems in achieving a flatter motor, and the number of manufacturing steps is increased, as well as the number of component parts.

SUMMARY OF THE INVENTION

Accordingly, the present invention has for its object to provide a flat brushless motor of a thin type, capable of generating vibrations, and also capable of reducing the number of component parts in the manufacturing steps.

In order to accomplish the above-mentioned object, the present invention is so constructed as to have the center of gravity of a rotor assembly moved to a position other than the center of rotation.

By the above-described construction, because of the rotation of the rotor assembly in an unbalanced state to generate vibrations, no weight is required, and it becomes possible to flatten the motor and to reduce the number of component parts in the manufacturing steps.

BRIEF DESCRIPTION OF THE DRAWINGS

This and other objects and features of the present invention will become apparent from the following description taken in conjunction with preferred embodiments thereof with reference to the accompanying drawings throughout which like parts are designated by like reference numerals, and in which.

DESCRIPTION OF PREFERRED EMBODIMENTS

One embodiment of the present invention will be hereinafter described with reference to the drawings.

Figure 1:
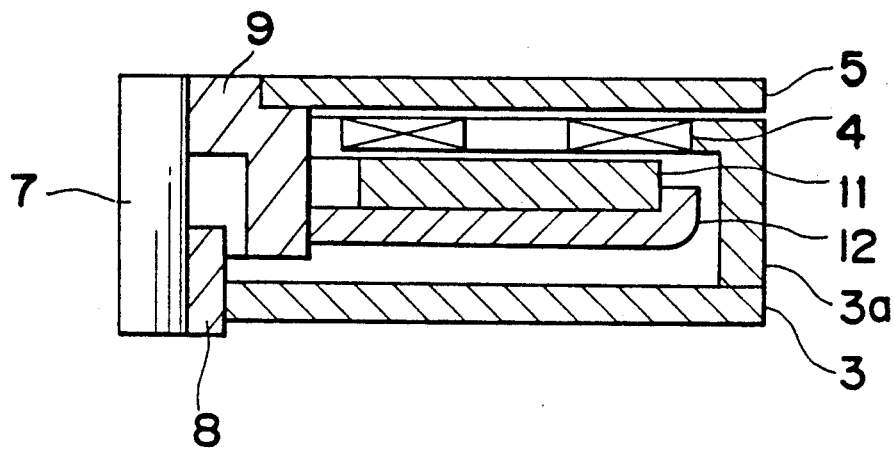
FIG. 1 is a sectional view of a half of a flat brushless motor in one embodiment of the present invention.

FIG. 1 illustrates a sectional view of a flat brushless motor in one embodiment of the present invention.

Figure 5:
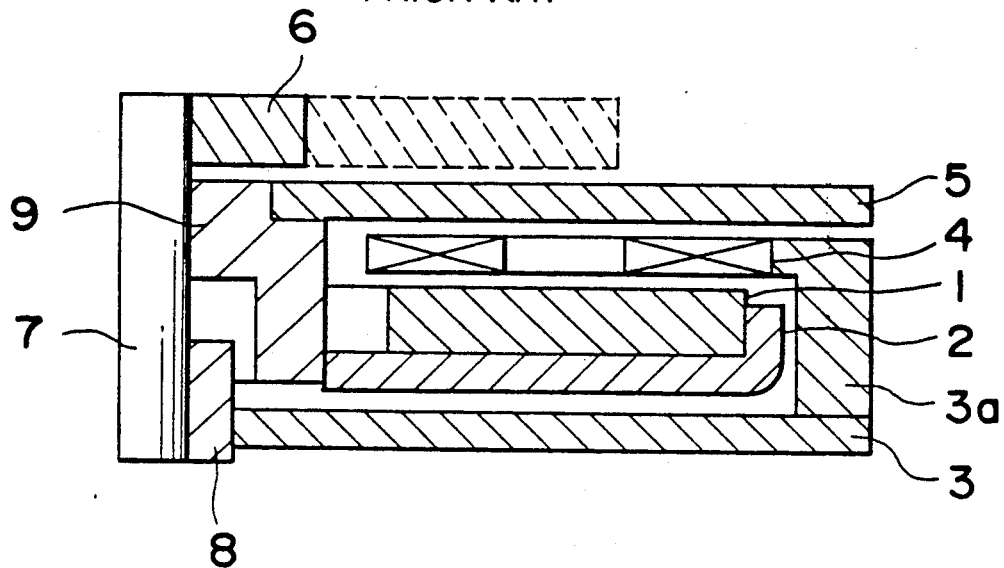
FIG. 5 is a sectional view of a conventional flat brushless motor.
Figure 6:
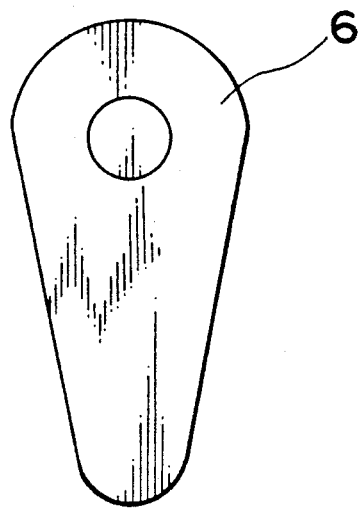
FIG. 6 is a front elevational view of a weight in the conventional flat brushless motor.

In FIG. 1, reference numeral 3 is a bracket, reference numeral 4 is a plurality of flat coils, reference numeral 5 is a back-yoke, reference numeral 7 is a shaft, reference numeral 8 is a sleeve bearing and reference numeral 9 is a rotor boss, all of which are the same construction as in FIG. 5.

The flat brushless motor of this embodiment is different from the conventional one in construction is that the rotor assembly, namely the magnet 11 and the rotor frame 12, has its center of gravity displaced from the center of rotation, thereby producing an unbalanced rotation. The details will be discussed hereinbelow with reference to FIGS. 2 and 3.

Figure 2:
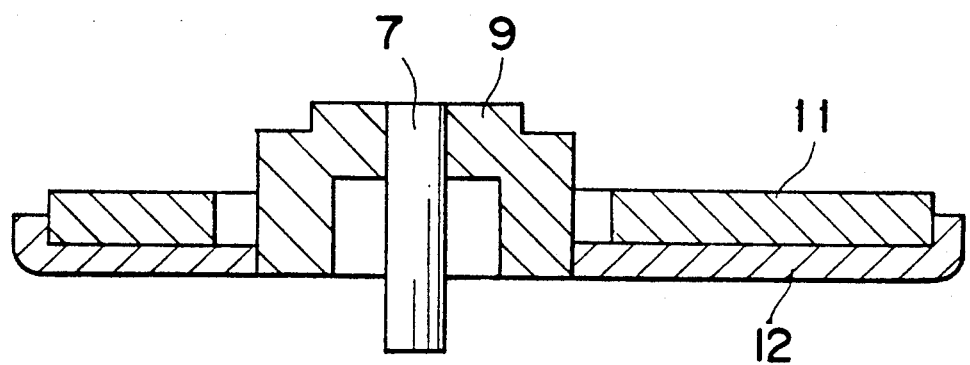
FIG. 2 is a sectional view of a rotor assembly of the flat brushless motor of FIG. 1.
Figure 3:
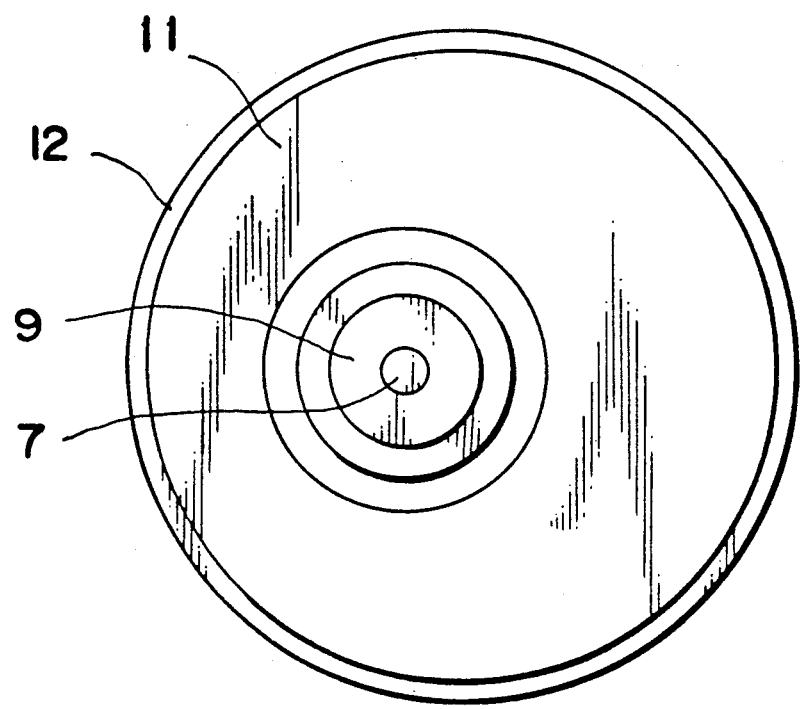
FIG. 3 is a front elevational view of the rotor assembly of FIG. 2.

FIGS. 2 and 3 respectively illustrate a sectional and a front elevational view of the rotor assembly, with its center of gravity displaced from the center of rotation. The rotor assembly has the following relationship:

$$(e \times 2\pi N/60)/1000 \geq 2.5$$

wherein e (μm) represents the displacement or eccentricity of the center of gravity relative to the center of rotation of the rotor assembly, i.e., 20 μm or more when the number of revolution of the rotor assembly represented by N (rpm) is 3000.

The operation of the flat brushless motor so constructed as described heretofore will be described hereinafter.

Since as hereinbefore described the rotor assembly has its center of gravity displaced relative to the center of rotation thereof, a magnetic unbalance and an unbalance resulting from a mechanical non-equilibrium are produced and vibrations are generated by the overall accumulation of these unbalances.

As described hereinabove, according to the one embodiment of the present invention, the flat brushless motor is effective to generate vibrations without using a weight because the center of gravity of the rotor assembly is displaced relative to the center of rotation to have the relationship $(e \times 2\pi N/60)/1000 \geq 2.5$, and can be manufactured compact, with the number of component parts being minimized.

A flat brushless motor in another embodiment of the present invention will be discussed hereinbelow.

Figure 4:
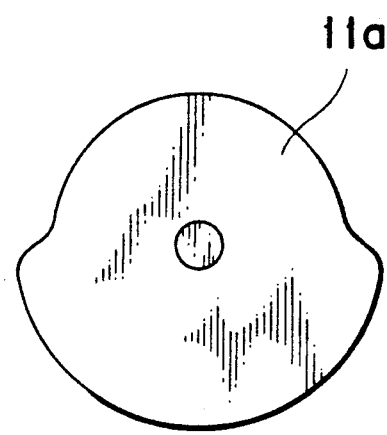
FIG. 4 is a front elevational view of a magnet of a flat brushless motor in a second embodiment of the present invention.

FIG. 4 illustrates a front elevational view of a magnet 11a for producing vibrations, with holding the relationship, $(e \times 2\pi N/60)/1000 \geq 2.5$ wherein e (μm) is the displacement of 20 μm or more at the number N (rpm) of revolution of 3000 rpm.

The operation of the flat brushless motor of the aforementioned construction will be explained.

As described earlier, because the magnet 11a is of a non-circular disk shape, a magnetic unbalance and an unbalance resulting from a mechanical non-equilibrium are produced and vibrations are generated by the overall accumulation of these unbalances.

As hereinabove described, according to the second embodiment of the present invention, the flat brushless motor is effective to generate vibrations without using any weight because the magnet is of a non-circular shape to have the relationship, $(e \times 2\pi N/60)/1000 \geq 2.5$, can be manufactured compact with the number of component parts being minimized.

It is to be noted here that the center of gravity of the rotor assembly is displaced relative to the center of rotation in the first embodiment, it may be possible to displace an inner and an outer diameters of the magnet 11 relative to each other. In this case, the same effect as attained when the center of rotation of the rotor assembly is displaced from the center of gravity thereof can be exerted without changing the shape of the rotor frame 12.

As is clear from the above description, the flat brushless motor of the present invention can generate unbalanced vibrations because the rotor assembly is such that it holds the relationship, $(e \times 2\pi N/60)/1000 \geq 2.5$, and can be manufactured compact, minimizing the number of component parts and manufacturing steps.

Although the present invention has been fully described by way of example with reference to the preferred embodiments thereof, various changes and modifications would be apparent to those skilled in the art. Therefore, unless otherwise such changes and modifications depart from the scope of the present invention, they should be construed as included therein.

What is claimed is:

1. A flat brushless motor, comprising:
    a flat annular magnet magnetized in a circumferential direction on an end face thereof so as to have alternating North and South poles;
    a rotor frame to which said magnet is fixed;
    a bracket for rotatably bearing said rotor frame;
    a back-yoke having a face disposed in face-to-face relationship with said magnet; and
    a plurality of flat coils disposed spacedly between said magnet and said back-yoke;
    wherein said magnet and said rotor frame together make up a rotor assembly, said rotor assembly having its center of gravity disposed relative to its center of rotation so as to satisfy the relationship $$\frac{e \times 2\pi N/60}{1000} \geq 2.5,$$

e representing the displacement of the center of gravity relative to the center of rotation in μm and N representing the number of revolutions in revolutions per minute.

2. The flat brushless motor as set forth in claim 1, wherein said magnet is of a non-circular disk shape.

* * * * *

UNITED STATES PATENT AND TRADEMARK OFFICE
CERTIFICATE OF CORRECTION

PATENT NO. : 5,027,025

DATED : June 25, 1991

INVENTOR(S) : Ryoji Saneshige, Kouzi Kuyama, Makoto Hasegawa and Miyuki Furuya.

It is certified that error appears in the above-identified patent and that said Letters Patent is hereby corrected as shown below:

Figures 1 and 5 are replaced by the following substitute Figures 1 and 5, respectively:

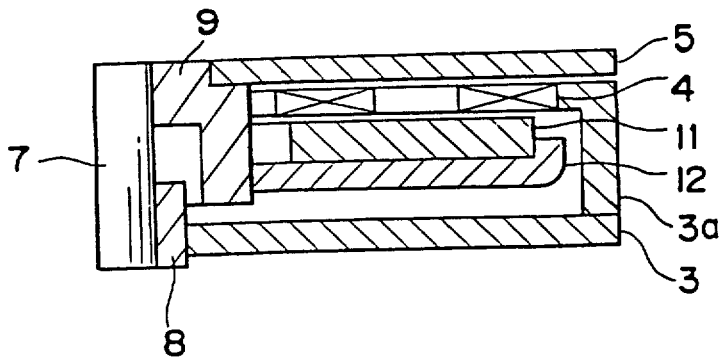

Fig. 1

UNITED STATES PATENT AND TRADEMARK OFFICE
CERTIFICATE OF CORRECTION

PATENT NO. : 5,027,025

DATED : June 25, 1991

INVENTOR(S) : Ryoji Saneshige, et al

It is certified that error appears in the above-identified patent and that said Letters Patent is hereby corrected as shown below:

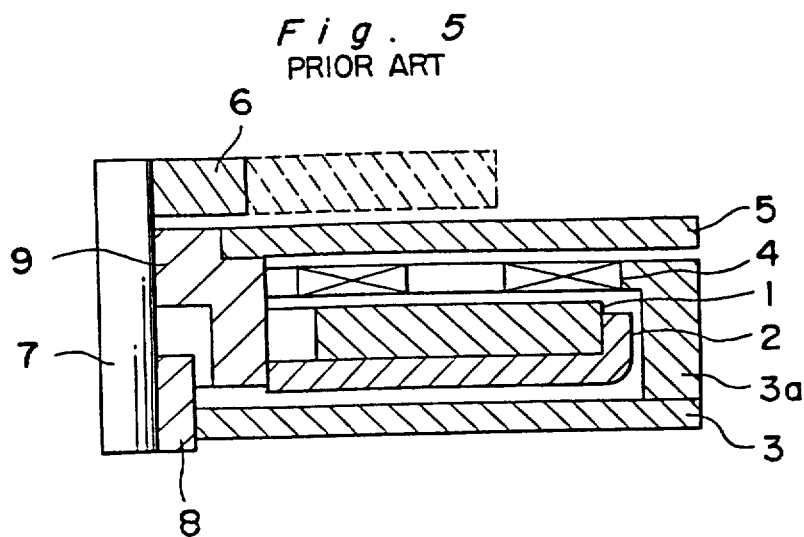

Fig. 5
PRIOR ART

Signed and Sealed this

Twenty-second Day of December, 1992

Attest:

DOUGLAS B. COMER

Attesting Officer    Acting Commissioner of Patents and Trademarks